INVENTOR
EDWARD J. ZDANUK
BY
ATTORNEY

United States Patent Office 3,455,663
Patented July 15, 1969

3,455,663
COMPOSITE METAL JOINT AND A COPPER-SILVER, TITANIUM BRAZING ALLOY
Edward J. Zdanuk, Lexington, Mass., assignor to P. R. Mallory & Co. Inc., Indianapolis, Ind., a corporation of Delaware
Filed Mar. 24, 1966, Ser. No. 537,036
Int. Cl. C22c 5/00
U.S. Cl. 29—198   14 Claims

ABSTRACT OF THE DISCLOSURE

A vacuum brazing alloy consisting essentially of about 0.5 to 5.0 by weight titanium, about 68.4 to 71.64 by weight silver, and the remainder essentially copper.

---

The present invention relates to brazing alloys and more particularly to a brazing alloy for brazing a tungsten member or a composite of tungsten to a metal member having a lower melting point than tungsten. The brazing of the members is carried out in a vacuum atmosphere.

A prerequisite for a material to be used in a vacuum atmosphere is low content of gases and constituents which may be converted to gas during use of the material in a vacuum environment. Fabrication of the material in a vacuum atmosphere provides a material that is low in gas content and matter that may be converted to gas during operation of the material in vacuum environments. In the fabrication of the vacuum material such as tungsten and copper, it is frequently necessary to join the tungsten member or a composite member of tungsten with the copper member to provide a material that is structurally strong and easily adaptable to service conditions.

Brazing a copper member to a tungsten member or a composite member of tungsten in a vacuum atmosphere requires that the constituents of the brazing material be given special attention. Any of the constituents of the brazing material which give off gases or vapors at any temperature during the brazing of the materials will spoil the vacuum environment and seriously impair the operation of the materials. The brazing alloy must include the property of wetting the tungsten and the copper equally as well so as to provide a strong braze joint and the property of having low vapor pressures at elevated temperatures to provide a brazed contact material having acceptable vacuum characteristics.

Attempts have been made to use a binary alloy of copper-silver to join the tungsten or tungsten composite to copper in vacuum environments, however, the alloy is substantially insoluble with the tungsten and as a result, thereof, merely surrounds the tungsten thereby providing a weak and superficial bond. The binary silver-copper brazing alloy wets the copper member but shows very little wetting of the tungsten member or the tungsten composite member.

Other brazing materials wet both the tungsten or the tungsten composite and the copper, but the vapor pressure of the material is such that it is not useful for brazing in vacuum atmospheres at elevated temperatures and/or the brazing materials form inter-metallic compounds which makes the tungsten brittle.

It has been found that a ternary silver-copper-titanium brazing alloy efficiently and effectively provides a strong braze joint between tungsten or a tungsten composite with copper. The brazing takes place in a vacuum atmosphere and produces a brazed assembly having acceptable high vacuum characteristics. The brazing alloy of silver-copper-titanium has a low vapor pressure at elevated temperatures in a vacuum atmosphere. The brazing alloy of the present invention wets the tungsten, the tungsten composite and the copper.

Therefore, it is an object of the present invention to provide a brazing alloy that will produce a brazed assembly having good vacuum characteristics.

Another object of the present invention is to provide a brazing alloy that has a low vapor pressure at elevated temperatures and when used in a vacuum will wet tungsten and composites of tungsten and another metal.

Yet another object of the present invention is to provide a brazing alloy that is efficient, effective and low in cost.

A further object of the present invention is to provide a brazing alloy which is low in gas content and low in constituents which may be converted to gas when the brazing alloy is used in a vacuum atmosphere.

Another object of the present invention is to provide a ternary brazing alloy of silver-copper-titanium suitable for use in brazing in vacuum environments.

Yet another object of the present invention is to provide a silver-copper-titanium brazing alloy that produces a good brazed joint, and that will adhere well and uniformly to the metal surfaces to be joined.

The present invention, in another of its aspects, relates to novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description and in the appended claims.

Generally speaking, the means and methods of the present invention relates to a brazing alloy for use in vacuum environments to join a tungsten member and a copper member. The brazing alloy consists of about 0.5 to 5 percent by weight titanium, about 68.4 to 71.64 percent by weight silver, and the remainder copper.

The brazing alloy is used in a vacuum atmosphere to provide an article of manufacture comprising a tungsten member and a copper member united by the brazing alloy. The members and the brazing alloy are heated to a temperature of about 800° to 850° centigrade at which temperature the brazing alloy wetted and joined the members.

In carrying out the present invention it was found that a silver-copper-titanium brazing alloy containing about 0.5 to 5.0 percent by weight of titanium the remainder silver and copper readily wets, yet does not react with the tungsten or the tungsten composite to form intermetallic compounds which make the brazed assembly brittle. In addition it was found that the brazing alloy had a low vapor pressure at elevated temperatures in a vacuum atmosphere.

The titanium content of about 0.5 to 5.0 percent by weight of the brazing alloy is critical in that it is effective for providing a strong brazed joint between two members, such as a tungsten member and a copper member. The silver and the copper are in a ratio of about 18 to 7 and remain substantially in this ratio as the titanium content of the brazing alloy is modified within the hereinbefore disclosed critical limits. It is thought that the ratio of silver to copper may be varied slightly without having any substantial adverse effect on the properties of the brazing alloy.

The range of the brazing alloy for joining tungsten or tungsten composites and copper is about:

| | Percent by wt. |
|---|---|
| Silver | 68.4–71.64 |
| Copper | 26.6–27.86 |
| Titanium | 0.5–5.0 |

The brazing alloy has a brazing temperature range of from about 800° to 850° centigrade, which is below the melting point temperature of either the tungsten, tungsten-copper composite, and the copper.

Figure 1:
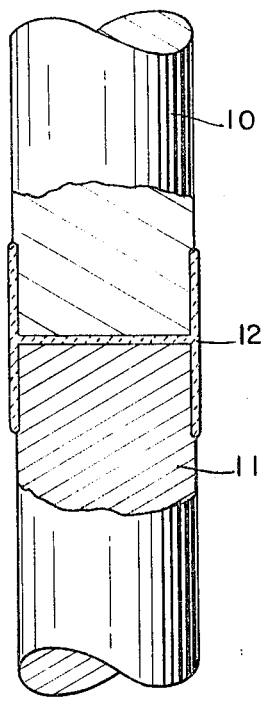
FIGURE 1 is a sectional view of a tungsten member and a copper member joined together with the silver-copper-titanium brazing alloy.

Referring now to FIGURE 1 of the drawings a copper member 10 is joined to a tungsten member 11 by the ternary brazing alloy composed of silver-copper-titanium 12. The figure illustrates that the brazing alloy uniformly wets the tungsten and the copper to a depth of only a few thousandths of an inch. The uniform wetting of the parts to be joined by the brazing alloy makes for a stronger brazed joint. Complete diffusion of the brazing alloy into the tungsten or into the copper should be avoided since complete diffusion might destroy the desirable characteristics of either the tungsten or the copper or both.

Figure 2:
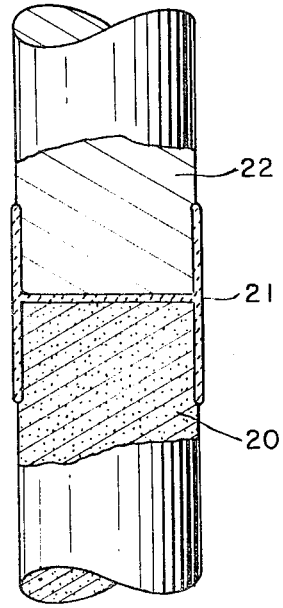
FIGURE 2 is a sectional view of a tungsten-copper-composite member and a copper member joined together with the silver-copper-titanium brazing alloy.

FIGURE 2 shows a tungsten-copper composite member 20 united to a copper member 22 by a brazing alloy 21 composed of silver-copper-titanium. The brazing alloy wets the tungsten-copper composite member and the copper member uniformly and only to a depth of a few thousandths of an inch. It should be noted that tungsten members can be brazed together, that tungsten-copper composite members can be brazed together, and that copper members can be brazed together using the silver-copper-titanium brazing alloy of the present invention. The metals to be brazed each have these common characteristics, that is, the brazing alloy wets the surfaces of these metals uniformly, the brazing alloy wets these metals to a few thousandths of an inch, and the metals to be brazed have a melting point above the melting point of the brazing alloy.

Example 1

A tungsten member and a copper member joined by a brazing alloy of silver-copper-titanium, the alloy containing about 68.4 percent by weight silver, about 26.6 percent by weight copper, and the remainder titanium.

A tungsten member and a copper member were placed in abutting relationship in a vacuum atmosphere having a pressure of $10^{-5}$ torr or less. The joint between the tungsten member and the copper member was contacted with a brazing alloy containing 68.4 percent by weight silver, 26.6 percent by weight copper, and the remainder titanium. The brazing alloy was heated to a temperature of about 800° centigrade for about 20 minutes. The tungsten member and the copper member were joined by the brazing alloy. The brazing alloy wetted the tungsten and the copper uniformly and to a depth of a few thousandths of an inch providing a strong brazed joint. FIGURE 1 of the drawing illustrates the brazed joint formed using the above described means and methods.

Example 2

A tungsten member and a copper member joined by a brazing alloy of silver-copper-titanium, the alloy containing about 70.56 percent by weight silver, about 27.44 percent by weight copper, and the remainder titanium.

A tungsten member and a copper member were placed in abutting relationship in a vacuum atmosphere having a pressure of $10^{-5}$ torr or less. The joint between the tungsten member and the copper member was contacted with a brazing alloy containing 70.56 percent by weight silver, 27.44 percent by weight copper, and the remainder titanium. The brazing alloy was heated to a temperature of about 815° centigrade for about 20 minutes. The tungsten member and the copper member were joined by the brazing alloy. The brazing alloy wetted the tungsten and the copper uniformly and to a depth of a few thousandths of an inch providing a strong brazed joint.

Example 3

A tungsten-copper composite member and a copper member joined by a brazing alloy of 71.64 percent by weight silver, 27.86 percent by weight copper, and the remainder titanium.

A copper member and a tungsten-copper composite member were placed in abutting relationship in a vacuum atmosphere having a pressure of $10^{-5}$ torr or less. The joint between the copper member and the tungsten-copper composite member was contacted with a brazing alloy containing 71.64 percent by weight silver, 27.86 percent by weight copper and the remainder titanium. The brazing alloy was heated to a temperature of about 850° centigrade for about 20 minutes. The copper member and the tungsten-copper composite member were joined by the brazing alloy. The brazing alloy wetted the copper and the tungsten-copper composite member uniformly and to a depth of a few thousandths of an inch providing a strong brazed joint. FIGURE 2 of the drawings illustrates the brazed joint formed using the above described means and methods.

The present invention is not intended to be limited to the disclosure herein, and changes and modifications may be made by those skilled in the art without departing from the spirit and the scope of the present invention. Such modifications and variations are considered to be within the purview and the scope of the present invention and the appended claims.

Having thus described my invention, I claim:

1. A brazing alloy consisting essentially of about 0.5 to 5 percent by weight titanium, and the remainder essentially silver and copper in a ratio of about 18 parts silver to about 7 parts copper.

2. The brazing alloy of claim 1 wherein said titanium is about 0.5 percent by weight, said silver is about 71.64 percent by weight, and the remainder is said copper.

3. The brazing alloy of claim 1 wherein said titanium is about 2.0 percent by weight, said silver is about 70.56 percent by weight, and the remainder is said copper.

4. The brazing alloy of claim 1 wherein said titanium is about 5.0 percent by weight, said silver is about 68.4 percent by weight, and the remainder is said copper.

5. A brazed joint comprising a copper member, a tungsten member, and a braze alloy joining said members consisting essentially of 0.5 to 5.0 percent by weight titanium, the remainder essentially silver and copper in a ratio of about 18 parts silver to 7 parts copper.

6. The article of claim 5 wherein said tungsten member is a tungsten-copper composite.

7. The article of claim 5 wherein said titanium is about 2.0 percent by weight, said silver is about 70.56 percent by weight, and the remainder is said copper.

8. The article of claim 5 wherein said titanium is about 0.5 percent by weight, said silver is about 71.64 percent by weight, and the remainder is said copper.

9. A brazed joint as claimed in claim 5, wherein said brazing alloy substantially uniformly penetrates said tungsten member and said copper member a few thousandths of an inch.

10. A brazed joint as claimed in claim 9, wherein said brazed joint includes a thickness which consists essentially of said silver and said copper and said titanium.

11. A brazed joint as claimed in claim 9, wherein said tungsten member is a composite of tungsten.

12. A brazed joint as claimed in claim 11, wherein said tungsten composite consists essentially of tungsten and copper.

13. A brazed joint as claimed in claim 5, wherein said brazed alloy consists essentially of 0.5 to 5 percent by weight of said titanium, about 26.6 to 27.86% by weight of said copper and about 68.4% to 71.64% by weight of said silver.

14. A brazed joint as claimed in claim 5, wherein said joint has a low gas content and low content of materials which may release gas in a vacuum environment.

References Cited

UNITED STATES PATENTS

| | | |
|---|---|---|
| 1,023,332 | 4/1916 | Rossi. |
| 2,137,201 | 11/1938 | Boyer. |
| 2,151,567 | 3/1939 | Seemann. |
| 2,259,668 | 10/1941 | Spanner. |
| 2,387,903 | 10/1945 | Hensel _____ 29—198 X |
| 2,506,326 | 5/1950 | Adams _____ 29—198 X |
| 2,520,955 | 9/1950 | Okress. |
| 2,950,189 | 8/1960 | Ames _____ 75—173 X |
| 2,953,844 | 9/1960 | Gelb. |

HYLAND BIZOT, Primary Examiner

U.S. Cl. X.R.

29—194, 199; 75—173